2,633,485

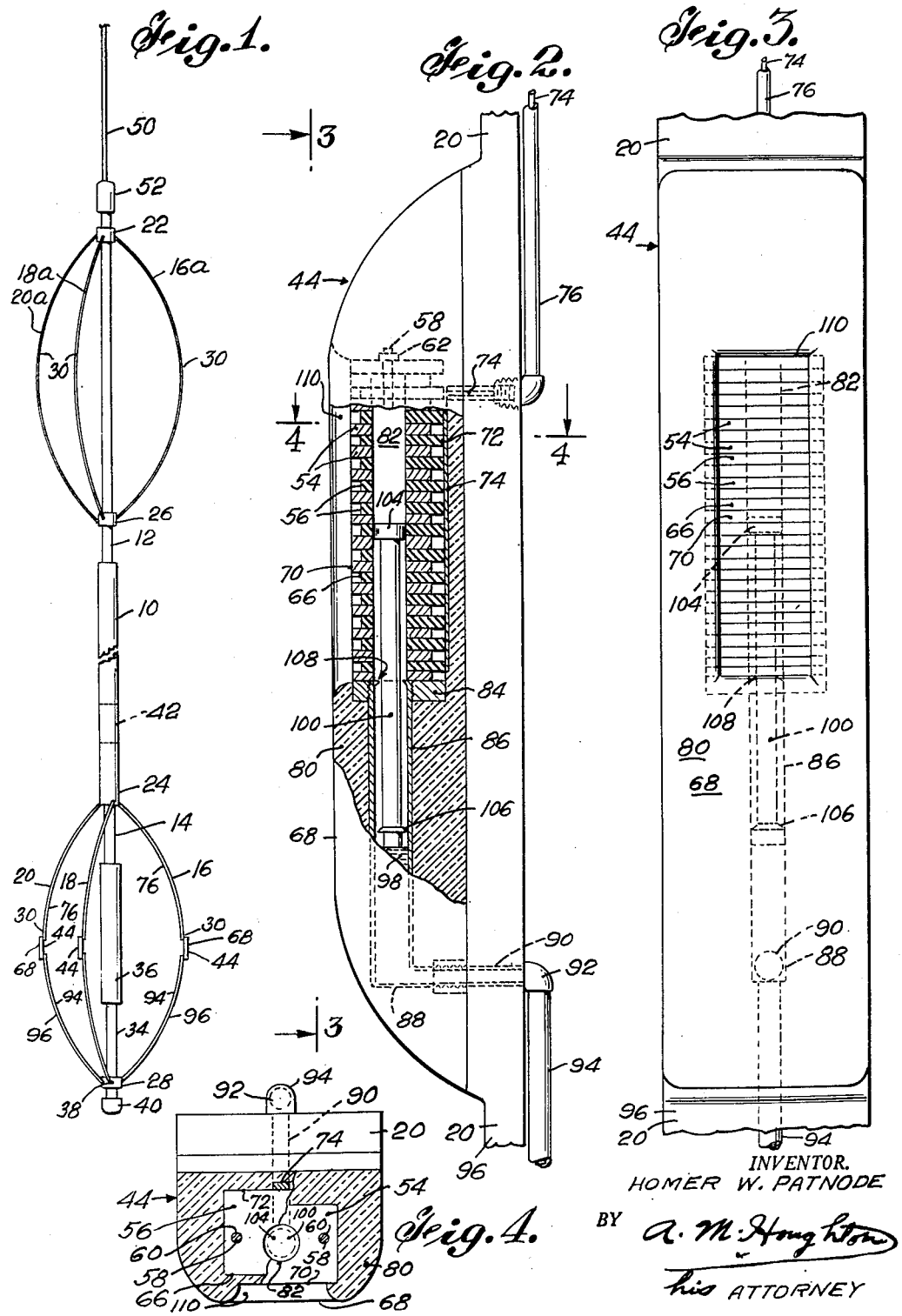
March 31, 1953     H. W. PATNODE     2,633,485
ELECTRICAL DIP METER FOR LOGGING BOREHOLES
Filed March 20, 1952
INVENTOR.
HOMER W. PATNODE
BY A. M. Houghton
his ATTORNEY Patented Mar. 31, 1953

UNITED STATES PATENT OFFICE 2,633,485

ELECTRICAL DIP METER FOR LOGGING BOREHOLES

Homer W. Patnode, Hampton Township, Allegheny County, Pa., assignor to Gulf Research & Development Company, Pittsburgh, Pa., a corporation of Delaware Application March 20, 1952, Serial No. 277,698

8 Claims. (Cl. 175—182)

This invention relates to improvements in electrical dip meters and the like.

An object of the invention is to provide an improved device for making continuous electrical measurements in a borehole in connection with appropriate recording equipment at the surface.

Another object of the invention is to provide a device whereby a record obtained in logging a borehole is capable of use in determination of the direction and dip of the strata traversed by the borehole.

A further object of the invention is to provide apparatus of the character described, which automatically compensates for direction and degree of inclination of the borehole, making it unnecessary and optional with the user of the device, as to whether or not such factors will be measured and/or interpreted in evaluating the results.

Still another object of the invention is to provide a novel and improved device for logging boreholes, in which the electrodes from which the resistivity or self-potential of the strata is being measured, are automatically selected so as to be all in the same horizontal plane when the measurement is being made, thus automatically compensating for the direction and degree of borehole inclination without the need for intervention on the part of the operator.

Still a further object of the invention is to provide a novel and improved dip meter for electrical logging of boreholes, in which the construction is such that there is automatic correction for borehole inclination while logging, so that the resultant recorded data is, in effect that for a vertical hole, thus simplifying the practical approach to the problem of borehole logging, and vastly diminishing the time required to carry out the operation and interpretation of results.

Another object of the invention is to provide a novel and improved electrical borehole logging apparatus and method in the use of which a minimum number of required readings of the instruments is possible, and in which little, if any, special equipment is needed for evaluating and interpreting the results.

A further object of the invention is to provide a novel and improved electrical logging apparatus and method whereby the logging of large numbers of boreholes may be carried out not only expeditiously, but in the shortest possible time, and without the need for operators of more than ordinary skill and experience.

These and other objects and advantages of the invention will become apparent from the following description of a preferred embodiment thereof, as illustrated in the accompanying drawings, forming a part hereof, and in which, Figure 1 is a fragmentary elevational view showing an electrical logging instrument according to the invention;

Figure 2 is a fragmentary partly sectioned side elevational detail view showing one of the sensing electrode devices mounted on the spring arms of Figure 1;

Figure 3 is a frontal elevational view of the sensing electrode device such as might be seen when viewed from the left of Figure 2; and Figure 4 is a sectional fragmentary plan view taken substantially on plane 4—4 of Figure 2.

In the art of electrical logging, the natural potential or resistivity of the strata traversed by a borehole may be measured by an instrument lowered into the fluid in the borehole. By measuring the natural potential or resistivity of the strata at three or more equidistantly spaced intervals about the borehole, it is possible to calculate the angular dip of the beds from the horizontal and also the azimuthal direction of this dip, provided the azimuthal orientation of the logging instrument is known, the angle and direction of inclination of the borehole across the bed under study is known, and the diameter of the borehole is known. Such instruments are known to the art of electric well logging and widely used (cf. U. S. Patent 2,427,950).

Due to the limitations imposed by borehole diameter and other factors, there are complex problems involved in logging by such means. Thus it has been found usually impracticable to take more than a small number of inclinometer readings, which limits accurate bed-dip measurements to about fifteen stations. Secondly is the necessity for a mechanical computer to resolve the data into bed-dip and direction. The use of certain complex apparatus has come into vogue as a result, for recording the borehole inclination and azimuth data at short intervals, the object being ultimately to achieve substantially continuous recording, at least in theory.

The complexity of such methods and apparatus arises from the necessity for determining the direction and degree of hole inclination and correcting for this effect, which is superimposed on the bed-dip measurements. It is apparent then, that if all boreholes were vertical throughout their length, the problem would be materially simplified. Consequently, it is an important object and feature of the present invention to automatically correct for hole inclinations while logging, so that the resultant recorded data is, in effect, substantially that which would obtain in a vertical hole. Such a method and apparatus would appear to and does make a very substantial reduction in the number of required readings, from which the bed-dip and direction can be directly obtained readily by three or possibly two graphic solutions, or in other ways.

The apparatus of this invention accomplishing this is described below. Basically it may include three arms at 120 degree angular spacing which contact the walls of the borehole. An electrode device on each arm is used in measuring either the self-potential or the electrical resistivity by methods common to the art of electric logging. In order to correct for hole inclination, these three electrodes are automatically kept in a horizontal plane. This may be accomplished by a selector switch motivated by a leveling device which makes contact with the one appropriate electrode in each electrode device, the electrode being one of a stack of thin plate electrodes which are insulated from each other.

In order to understand clearly the nature of the invention, and the best means for carrying it out, reference may now be had to the drawings, which like numerals denote similar parts throughout the several views.

As seen in Figure 1, there is a mandrel 10, in any suitable shape, such as in the form of a hollow tube, with upper and lower extensions 12 and 14 secured thereto. Normally curved metal spring arms 16, 18, and 20, all identical but bowed outwardly as shown, are spaced angularly 120 degrees apart around the mandrel extensions 12 and 14. The bowed spring arms, such as arm 20, terminate at their upper ends in suitable collars such as shown at 22 or the lower end 24 of the central portion 10 of the mandrel, and similarly have their lower ends terminating in suitable collars such as shown at 26 and 28. It is clear that since the bowed spring arms have an inherent resiliency tending to increase the degree of bowing outward, they will, when inserted into a borehole, tend to have their middle portions 30 expanding always into continuous contact engagement against the walls of the borehole, even though it be of variable diameter.

Thus, in order to obtain an indication of the diameter of the hole at the location of the logging device, the spring arms 16, 18, and 20, for example, may be so constructed as to move a piston 34 up or down in a cylinder 36 carried by the lower mandrel extension 14, the collar 28 being secured to the piston 34 for movement therewith, by means of the pin 38, just above the head 40. By means of suitable equipment inside the cylinder 36, it is seen that the actual horizontal extension of the arms 16, 18, and 20, that is to say, the borehole inside diameter, may be measured. This may be accomplished by suitable mechanical linkages actuating electrical potentiometers coupled to indicating instruments reading directly in borehole diameters, or other means may be employed for converting the extension of the spring arms 16, 18, and 20 into suitable units.

The logging instrument includes a device 42 of any suitable kind well known in the art, for measuring the azimuth, or azimuth and inclination of the instrument. Such a device may incorporate a magnetic or other form of compass and the like, constructed and arranged so that readings thereof may be made continuously or taken at frequent or predetermined intervals, or as desired. Such azimuthal and inclination measuring apparatus does not form a part of my invention.

Each of the spring arms, such as 16, 18, and 20, carries mounted on its middle portion 30, an electrode or sensing device or unit 44, there being thus three such units, equidistantly and equiangularly spaced from each other. The sensing units 44 are thus on the outer portions of the spring arms, so that the electrodes are held closely adjacent to, but out of contact with, the wall of the borehole. Thus, each of the sensing units 44 moves with the central portion of the spring arm on which it is mounted. The entire logging instrument or device as seen in Figure 1, is suspended from the surface of the borehole, by means of the multi-conductor electrical cable 50 which is secured to the upper mandrel extension head 52, and the wires inside the cable are connected to the various electrical elements of the logging device, and also to the instruments and power supplies located on the surface of the ground above the well. The suspension cable 50 will include steel strands or other suitable means having the desired length and strength to support the weight of the device and to facilitate raising and lowering it in the borehole past the various strata during the logging process. One or more recording devices at the surface may make a continuous record of the conditions encountered in the well.

As seen best in Figures 2, 3, and 4, each of the sensing electrode units 44 includes a number of metal plates 54 and 56, the plates 54 being spaced vertically from each other, and the plates 56 being disposed in between adjacent plates 54. The metal plates 54 are insulated from electrical contact with each other by any suitable means, such as by a thin coating of insulating material, varnish or the like on their abutting faces, and similarly with the metal plates 56, the insulating coating being applied to all surfaces thereof which abut on the plates 54. The stacks of plates 54 and 56 are held in stacked array by means of the insulated tie-rods or bolts 58 extending through aligned holes 60 in the plates and secured by nuts 62. It is thus clear that the insulating varnish or other layer coating the plates, keeps all the plates 54 out of immediate electrical contact with the plates 56. From Figures 2 and 4, it is also clear that the plates 54 are offset somewhat from the edges of the plates 56, so that the outer edges 66 of the plates 56 are disposed substantially inwardly to a greater degree from the face 68 of the sensing units such as 44, than are the outer edges 70 of the plates 54.

While these outer edges 70 of the plates 54 remain uninsulated, the edges 66 of the plates 56 are coated with the insulating varnish or other insulating material which separates adjacent plates 54 and 56, so that the plates 56 are insulated from electrical contact with the fluids, muds or the like inside the borehole. All of the metal plates 56 are connected electrically at their rear edges 72 to a bus bar or connecting rod 74 or riser, which extends through a conduit pipe 76 of a flexible nature to flex with the bowed spring arms 16, 20 and the like, and is carried upwardly thereby for ultimate connection with the cable 50 and the instruments thereabove. The wire conductor 74 is of course insulated from the duct 76 and other parts of the logging device, being connected ultimately into the recording circuit on the ground.

The device 44 includes an insulating matrix 80 or pad of insulating composition such as of rubber, encasing the stack of electrodes 54 and 56 and the other parts shown. A series of vertically aligned holes through the stacked electrode plates 54 and 56 combine to form a vertical cylinder or tube 82, and is connected through a lower plate 84 to a tube 86 bent at its lower end 88 and coupled to a horizontal tube 90, and ultimately by an elbow 92 to a riser pipe 94. The external riser pipe 94 is quite flexible and extends downwards along the inner surface of the lower half 96 of the bowed spring arms such as 20, to a common junction at the collar 28, at which pipe 94 on spring arm 16 is coupled to the lower end of pipe 94 on spring arm 18 and on spring arm 20. Thus there is intercommunication between the bores or recesses 82 in each of the three matrixes 80, through their depending respective ducts 94 and the coupling 28 which may be internally hollow for this purpose.

The tubes 86, 90, and 94 and the intercoupling 28 are filled with a liquid such as mercury 98 substantially to the level shown in Figure 2, assuming the device to be vertical when the level is established on pouring in the electrically conductive mercury. A float 100 made of insulating material, such as Bakelite, plastic, wood, or other material not subject to chemical action with the mercury, is disposed within the opening or well hole 82 inside the matrix 80 in each of the devices 44, so as to be supported by the liquid mercury 98. On the top of the float 100 is a metallic contact or brush member 104 which moves upwards and downwards with the float and makes sliding electrical contact between adjacent plates 54 and 56, its thickness being chosen for this purpose. However, it is thick enough so that it will always be in electrical contact with at least one plate 54 and an adjacent plate 56 so as to afford sliding interconnection therebetween as the float moves in bore 82.

A valve 106 on the shank of the float 100 and movable therewith, is adapted to close against the valve seat 108 on the upper end of bushing pipe 86 to prevent influx of liquid mercury into the upper portion of bore 82 if the liquid level becomes too high, so as not to short-circuit the plates 54 and 56. It is seen that a window 110 is formed in the face 68 of the matrix or body 80 to afford access to the conductive outer edges 70 of the plates 54 only, the edges 66 of the other plates 56 being coated with insulation where they front on the window. Hence only the edges 70 of the plates 54 may make electrical contact with the fluids, muds and the like in the well borehole.

In operation, the upper surface of the liquid such as mercury 98 in each of the three tubes 86 will always lie in a common horizontal plane irrespective of the degree of inclination or the diameter of the borehole, within practical limits. The contacts or brushes 104 will always complete an electrical circuit through one of the plates 54 exposed to the borehole fluid through the window 110, and the plates 56, and it is apparent that the three thus selected plates 54 which are in contact with the brushes 104, all lie in a common horizontal plane, these being the very plates which serve as electrodes for measuring the self-potential or resistivity of the strata under study.

It is also apparent that the device thus described automatically corrects for inclination of the borehole so that it need not be measured. This permits continuous logging of the borehole and simple calculation of bed dip from the log and direction of dip when the azimuth of the instrument is known.

Although I have described the invention in specific terms, it will be understood that various changes may be made in size, shape, materials and arrangement without departing from the spirit and scope of the invention.

What I claim is:

1. A well-logging device comprising a frame constructed and arranged for traversing a borehole, arm means carried by said frame and constructed and arranged for maintaining contact with the walls of said borehole, a vertical series of electrode means carried by each of said arm means for effecting electrical contact with fluid in said borehole, and means for closing an electric circuit with a selected plurality of said electrode means disposed in a common horizontal plane, and capable of being connected to indicating and measuring means for making electrical measurements in said plane.

2. A well-logging device comprising a frame constructed and arranged for traversing a borehole, a plurality of arm means carried by said frame and constructed and arranged for maintaining contact with the walls of said borehole at angularly-spaced locations, a plurality of stacked electric plate means forming electrodes carried by said arm means for effecting electrical contact with fluid in said borehole, each of said arm means carrying one of said stacks of electric plate means in mutually spaced array, bus electrode means connected to an indicating and measuring circuit, and brush means constructed and arranged for effecting electrical interconnection between said brush electrode means and automatically selected electric plate means lying in a common horizontal plane therewith.

3. Well-logging apparatus comprising a frame, cable means supporting said frame for being moved through a borehole, a plurality of angularly-spaced resilient arm means carried by said frame and constructed and arranged for maintaining yielding contact with the walls of said borehole, electrical measuring means connected to said cable means, a plurality of sensing unit means, one of said sensing unit means being carried by each of said resilient arm means at a location where contact is made with the wall of the borehole, each of said sensing unit means comprising a plurality of electrode plates disposed in stacked vertical mutually-spaced array, and bus electrode means in each sensing unit means and connected to said electrical measuring means, and each sensing unit comprising brush contact means connected to said bus electrode means and constructed and arranged for traversing in turn each of said plurality of electrode plates for making contact therewith in passing, to effect connection thereof with said bus electrode means, and means in each sensing unit for actuating said brush contact means to move responsive to any inclination in said frame as a result of borehole deviation from the vertical, whereby all said brush contact means are maintained in a common horizontal plane, and whereby said brush contact means effect simultaneous contact with electrode plates lying in a common horizontal plane.

4. The construction according to claim 3, wherein said sensing unit means comprise insulating matrixes.

5. The construction according to claim 3, wherein said sensing unit means comprise insulating matrixes having windows formed therein, with conducting surfaces of said electrode plates opening on said windows and constructed and arranged for making electrical contact with borehole fluids, muds, and the like.

6. The construction according to claim 3, wherein said sensing unit means comprise insulating matrixes having windows formed therein, with conducting surfaces of said electrode plates opening on said windows and constructed and arranged for making electrical contact with borehole fluids, muds, and the like, and wherein each of said plurality of electrode plates is provided with a bore, float means disposed in said bore, well means communicating with said bore, liquid means disposed in said well means and supporting said float means, duct means effecting intercommunication between all said well means and affording free passage for said liquid means, whereby a common liquid surface level is maintained in all said well means, brush means aforesaid carried by said float means and movable therewith, as the inclination of said apparatus in said borehole changes, whereby, each of said brush means makes contact engagement between said bus electrode means and such of said electrode plates as are in a common horizontal plane.

7. The construction according to claim 6, wherein there is a normally-open valve means below each said bore, said valve means being actuated by said float means and constructed and arranged to close said bore from said well upon abnormal inclination of said borehole beyond a predetermined angle to vertical, to block ingress of said liquid into contact with the surfaces of said electrode plates bordering on said interior bore formed therein.

8. The construction according to claim 6, wherein said fluid in said interior bores comprises liquid mercury.

HOMER W. PATNODE.

REFERENCES CITED

The following references are of record in the file of this patent:

UNITED STATES PATENTS

| Number | Name | Date |
| --- | --- | --- |
| 2,176,169 | Doll | Oct. 17, 1939 |
| 2,427,950 | Doll | Sept. 23, 1947 |
| 2,476,137 | Doll | July 12, 1949 |